（12）United States Patent
Hanayama et al.

(10) Patent No.: US 11,677,911 B2
(45) Date of Patent: Jun. 13, 2023

(54) DISPLAY APPARATUS CAPABLE OF CONTROLLING A POSITION OF A DISPLAY RANGE BASED ON A CHANGE OF FOCAL DISTANCE

(71) Applicant: CANON KABUSHIKI KAISHA, Tokyo (JP)

(72) Inventors: Tatsuya Hanayama, Tokyo (JP); Yusuke Toriumi, Tokyo (JP); Takuya Sakamaki, Kanagawa (JP); Atsushi Sugawara, Kanagawa (JP); Kaori Tomura, Tokyo (JP); Yosuke Fukai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 17/094,958

(22) Filed: Nov. 11, 2020

(65) Prior Publication Data

US 2021/0152780 A1 May 20, 2021

(30) Foreign Application Priority Data

Nov. 14, 2019 (JP) .............................. JP2019-206245
Nov. 14, 2019 (JP) .............................. JP2019-206274

(51) Int. Cl.
*G02B 27/01* (2006.01)
*H04N 7/18* (2006.01)
*H04N 23/695* (2023.01)

(52) U.S. Cl.
CPC ............. *H04N 7/18* (2013.01); *H04N 23/695* (2023.01); *G02B 27/01* (2013.01)

(58) Field of Classification Search
CPC .. H04N 7/18; H04N 5/23299; H04N 5/23258; H04N 5/23261; H04N 5/23267; H04N 5/2354; H04N 7/185; H04N 23/69; G02B 27/01; G06T 7/13; G06T 5/002; G06T 5/20; G06T 7/12; G06T 7/246;
(Continued)

(56) References Cited

U.S. PATENT DOCUMENTS 6,215,461 B1    4/2001  Ishibashi et al.
2010/0302347 A1*  12/2010  Shikata ................ H04N 23/698
                                                            348/E7.001
(Continued)

FOREIGN PATENT DOCUMENTS

JP          2007-219069 A    8/2007
JP          2011-071884 A    4/2011
(Continued)

*Primary Examiner* — Pegeman Karimi
(74) *Attorney, Agent, or Firm* — Cowan, Liebowitz & Latman, P.C.

(57) ABSTRACT

A display apparatus according to the present invention is to be fixed on a head of a user, and includes: an image sensor configured to be capable of changing focal distance; a display configured to display, as a display range, a part of an image which is captured by the image sensor; an orientation detector configured to detect an orientation of the display apparatus; and at least one memory and at least one processor which function as a control unit configured to control a position of the display range based on a change of the orientation detected by the orientation detector, and the focal distance.

8 Claims, 12 Drawing Sheets

(58) Field of Classification Search
CPC . G06T 7/292; G06T 7/90; G06T 2207/20132; G06T 7/0004; G06T 2207/10016; G06T 2207/10024; G06T 2207/20032; G06T 2207/20081; G06T 7/11; G06T 7/136; G06T 7/187; G06T 2207/20024; G06T 2207/30242; G06V 40/10; G06V 10/26; G06V 10/30; G06V 10/44; G06V 20/05; A01K 61/59

See application file for complete search history.

(56) References Cited

U.S. PATENT DOCUMENTS

| | | | | |
|---|---|---|---|---|
| 2015/0226969 | A1* | 8/2015 | Tsukahara | G02B 27/0172 |
| | | | | 359/462 |
| 2016/0266644 | A1* | 9/2016 | Yamamoto | G06F 3/002 |
| 2020/0027242 | A1* | 1/2020 | Koyama | H04N 23/695 |

FOREIGN PATENT DOCUMENTS

| | | |
|---|---|---|
| JP | 2015-075697 A | 4/2015 |
| JP | 2015-149552 A | 8/2015 |

\* cited by examiner

DISPLAY APPARATUS CAPABLE OF CONTROLLING A POSITION OF A DISPLAY RANGE BASED ON A CHANGE OF FOCAL DISTANCE

This application claims the benefit of Japanese Patent Application No. 2019-206245, filed on Nov. 14, 2019, and Japanese Patent Application No. 2019-206274, filed on Nov. 14, 2019, which are hereby incorporated by reference herein in their entirety.

BACKGROUND OF THE INVENTION

Field of the Invention

The present invention relates to a display apparatus, and more particularly to an electronic binocular telescope.

Description of the Related Art

An electronic binocular telescope is a display apparatus which includes a camera and a display disposed directly in front of the eyes of the user during use, and displays images captured by the camera on the display in real-time. By viewing the images (telephotographic images) displayed on the display of the electronic binocular telescope, the user can observe distance as if looking through binoculars. Some electronic binocular telescopes are removably mounted (wearable) on the head, just like a head mount display.

Japanese Patent Application Publication No. 2015-149552 discloses a technique to detect a sightline of the user, and control the image capturing range so that the sightline position comes to the center of the image capturing range.

However, in the case of a commonly used electronic binocular telescope, the observation range (object range of the image displayed on the display (angle of view)) changes when the head moves unintentionally. Particularly in the case of displaying an image of which telescope magnification is high, the observation range is largely changed by a slight shaking of the head. Further, when the technique disclosed in Japanese Patent Application Publication No. 2015-149552 is used so that the image capturing range becomes the observation range, the sightline position becomes the center position of the image capturing range, which means that the observation range is changed by the line of sight even if the user wishes to view the entire of a desired observation range.

As described above, according to the prior art, the observation range unintentionally changes, therefore it is difficult to perform stable observation (e.g. observation with maintaining the observation range or with slowly changing the observation range; observation with tracking the observation target which moves quickly). The difficulties involved in stable observation may be stressful to the user. These problems occur regardless whether the electronic binocular telescope is wearable or not.

SUMMARY OF THE INVENTION

The present invention provides a technique to perform stable observation easily.

The present invention in its first aspect provides a display apparatus that is to be fixed on a head of a user, the display apparatus comprising:

an image sensor configured to be capable of changing focal distance;

a display configured to display, as a display range, a part of an image which is captured by the image sensor;

an orientation detector configured to detect an orientation of the display apparatus; and at least one memory and at least one processor which function as a control unit configured to control a position of the display range based on a change of the orientation detected by the orientation detector, and the focal distance.

The present invention in its second aspect provides a display apparatus that is to be fixed on a head of a user, the display apparatus comprising:

an image sensor configured to detect object distance;

a display configured to display, as a display range, a part of an image which is captured by the image sensor;

an orientation detector configured to detect an orientation of the display apparatus; and at least one memory and at least one processor which function as a control unit configured to control a position of the display range based on a change of the orientation detected by the orientation detector, and the object distance detected by the imaging capturing unit.

The present invention in its third aspect provides a control method of a display apparatus that is to be fixed on a head of a user, the display apparatus including:

an image sensor configured to be capable of changing focal distance; and a display configured to display, as a display range, a part of an image which is captured by the image sensor, the control method comprising:

detecting an orientation of the display apparatus; and controlling a position of the display range based on a change of the detected orientation, and the focal distance.

The present invention in its fourth aspect provides a non-transitory computer readable medium that stores a program, wherein the program causes a computer to execute a control method of a display apparatus that is to be fixed on a head of a user, the display apparatus including:

an image sensor configured to be capable of changing focal distance; and a display configured to display, as a display range, a part of an image which is captured by the image sensor, the control method comprising:

detecting an orientation of the display apparatus; and controlling a position of the display range based on a change of the detected orientation, and the focal distance.

The present invention in its fifth aspect provides a display apparatus comprising:

an image sensor configured to be capable of changing an image capturing direction in a panning direction and a tilting direction independently;

a display configured to display an image captured by the image sensor;

an orientation detector configured to detect an orientation of the display apparatus; and a control unit configured to control the image capturing direction based on a change of the orientation detected by the orientation detector.

The present invention in its sixth aspect provides a control method of a display apparatus that includes an image sensor configured to be capable of changing an image capturing direction in a panning direction and a tilting direction independently, and a display configured to display an image captured by the image sensor, the control method comprising:

detecting an orientation of the display apparatus; and controlling the image capturing direction based on a change of the detected orientation.

The present invention in its seventh aspect provides a non-transitory computer readable medium that stores a program, wherein the program causes a computer to execute a control method of a display apparatus that includes an image sensor configured to be capable of changing an image capturing direction in a panning direction and a tilting direction independently, and a display configured to display an image captured by the image sensor, the control method comprising:

detecting an orientation of the display apparatus; and
controlling the image capturing direction based on a change of the detected orientation.

Further features of the present invention will become apparent from the following description of exemplary embodiments with reference to the attached drawings.

DESCRIPTION OF THE EMBODIMENTS

Embodiment 1

Embodiment 1 of the present invention will be described. Here an example of applying the present invention to an electronic binocular telescope that can be removably mounted (wearable) on the head, as in the case of a head mount display, will be described, but a display apparatus to which the present invention is applicable is not limited to the wearable electronic binocular telescope. For example, the present invention may be applied to an electronic binocular telescope that is not wearable, or may be applied to a different wearable device that can be removably mounted on the head (such a head mount display as VR goggles, AR glasses, MR glasses and smart glasses). The present invention may also be applied to a display apparatus that covers both eyes of the user (e.g. VR goggles) so that the user cannot view the periphery with naked eyes (user can view the image with both eyes). Furthermore, the present invention may be applied to a display apparatus that covers only one eye of the user, so that the user can view the image using one eye and view the periphery using the other eye (naked eye). According to the present invention, observation can be performed well even if the user cannot see the object with naked eyes, hence the present invention can be suitably applied to a display apparatus which covers both eyes (described in detail later).

Figure 2A:
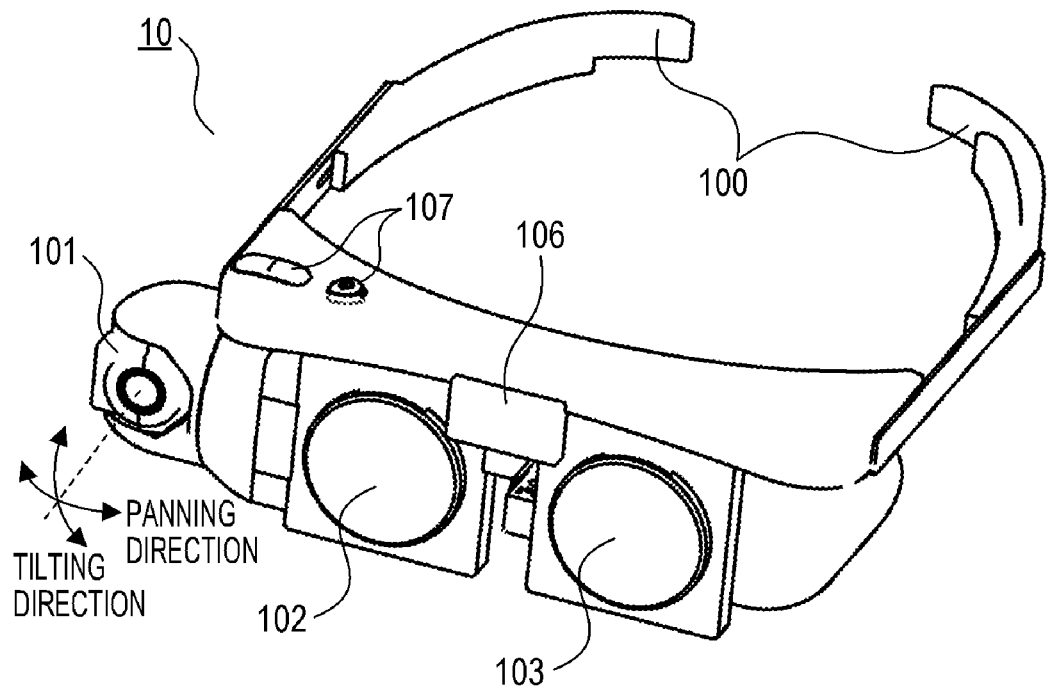
FIG. 2A and FIG. 2B are external views of an electronic binocular telescope according to Embodiments 1 to 6.
Figure 2B:
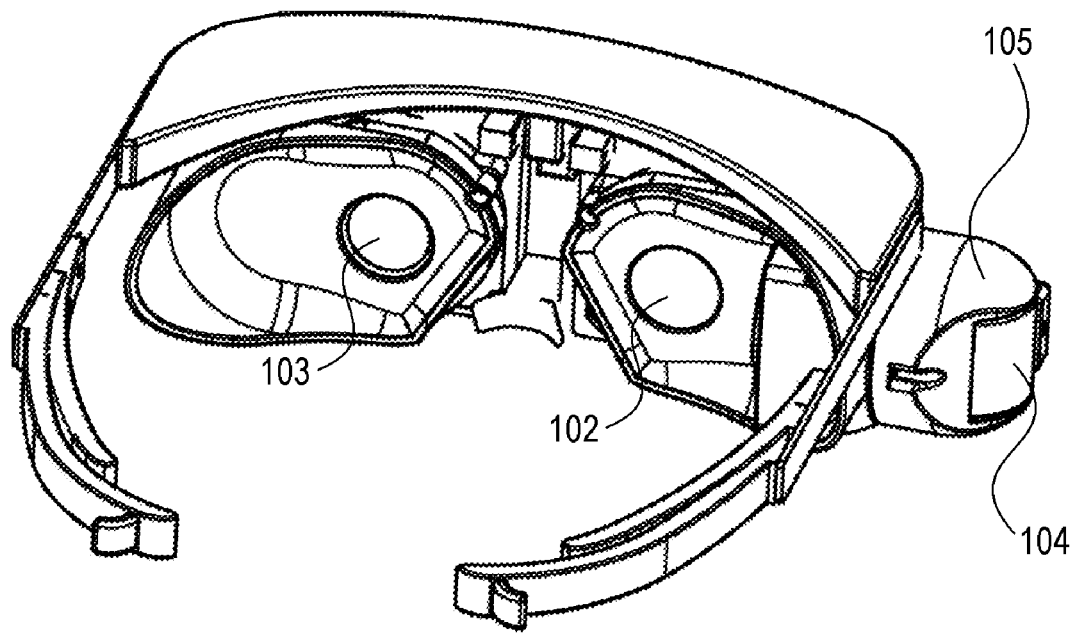

FIG. 2A and FIG. 2B are external views illustrating a hardware configuration of an electronic binocular telescope 10 according to Embodiment 1. FIG. 2A is a front perspective view when the electronic binocular telescope 10 is viewed from the front side, and FIG. 2B is a rear perspective view when the electronic binocular telescope 10 is viewed from the rear side. The electronic binocular telescope 10 is a spectacle type electronic binocular telescope and is wearable on the head. Specifically, the electronic binocular telescope 10 is fixed (worn) on the head by cradling the head by the temples 100 on the left and right of the electronic binocular telescope 10. Besides the temples 100, the electronic binocular telescope 10 includes a camera 101, displays 102 and 103, a panning unit 104, a tilting unit 105, a gyro sensor 106, and an operation member 107.

The camera 101 is an imaging unit (image sensor), and is rotatable in the panning direction and the tilting direction independently as indicated by the arrows in FIG. 2A. In other words, the image capturing direction of the camera 101 (a direction from the camera 101 to an object corresponding to an image capturing range, such as a direction from the camera 101 to an object position corresponding to a center position of the image capturing range; optical axis direction of the camera 101) can be changed in the panning direction and the tilting direction independently. The panning unit 104 rotates the camera 101 in the panning direction (direction of tilting the camera 101 left or right with respect to the electronic binocular telescope 10) by driving an actuator built into the panning unit 104. The tilting unit 105 rotates the camera 101 in the tilting direction (direction of tilting the camera 101 up or down with respect to the electronic binocular telescope 10) by driving an actuator built into the tilting unit 105. The mechanism to change the image capturing direction is not especially limited.

The camera 101 is configured such that the focal distance thereof is changeable. In Embodiment 1, it is assumed that the focal distance of the camera 101 is switchable in two levels: 100 mm and 400 mm (both are focal distances converted into the case where full size is 35 mm) in accordance with the operation which the user performed (user operation) to the electronic binocular telescope 10. The operation member 107 is a member to receive the user operation (e.g. buttons, switches), and to receive such user operation to change (switch) the focal distance of the camera 101 or to instruct power ON/OFF of the electronic binocular telescope 10, for example. A number of the focal distances and the ranges of the focal distances that can be set are not especially limited. The focal distance may be seamlessly changeable within a predetermined range.

Moreover, the camera 101 includes an auto focus function, and is configured to automatically focus on an object included in the imaging range. The object distance at which the object is focused is uniquely determined by the stop position of a focusing lens (not illustrated), which is driven in the focus adjustment (auto focus) processing. Therefore if information indicating the relationship between the stop position of the focusing lens and the object distance (e.g. table, function) is stored in the electronic binocular telescope 10 in advance, the electronic binocular telescope 10 can detect the object distance based on the stop position of the focusing lens using this information. The camera 101 includes the function to detect the object distance using such a method. The method of detecting the object distance, however, is not especially limited.

The displays 102 and 103 are display units on which a part of an image captured by the camera 101 is displayed (as the display range) respectively. The display range may be displayed based on the image generated by developing the entire imageable range, or only the display range may be read from the camera 101 (image pickup element) and developed, then this developed image may be displayed. When the user wears the electronic binocular telescope 10, the display 102 is disposed in front of the right eye of the user, and the display 103 is disposed in front of the left eye of the user. As a result, the user views the image displayed on the display 102 with the right eye, and the image displayed on the display 103 with the left eye. The display range can be independently moved in the panning direction (left-right direction (horizontal direction) of the captured image), and in the tilting direction (up-down (vertical direction) of the captured image). The moving direction of the display range (direction of changing the position of the display range) and the like are not especially limited.

The gyro sensor 106 is an orientation detection unit (orientation detector) that detects an orientation of the electronic binocular telescope 10, and can also detect the change of the orientation (e.g. whether a change occurred or not, direction of change, magnitude of change) of the electronic binocular telescope 10. In the case where the user is wearing the electronic binocular telescope 10, the orientation of the electronic binocular telescope 10 corresponds to the orientation of the head of the user. This means that the gyro sensor 106 can detect the orientation and motion (shaking) of the head.

Figure 3:
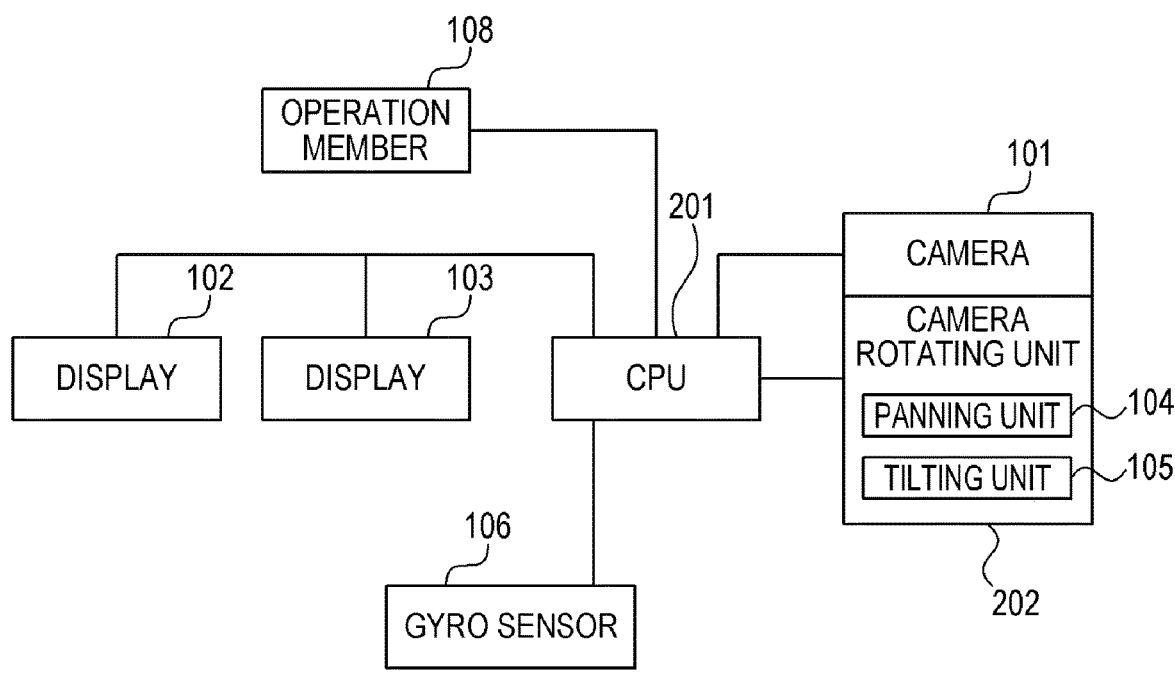
FIG. 3 is a block diagram of the electronic binocular telescope according to Embodiments 1 to 6.

FIG. 3 is a block diagram illustrating the configuration of the electronic binocular telescope 10. A CPU 201 controls each component of the electronic binocular telescope 10. The CPU 201 is connected to the camera 101, the displays 102 and 103, the gyro sensor 106, the operation member 107, a camera rotating unit 202, and the like. The CPU 201 processes information sent from each component of the electronic binocular telescope 10, or controls operation of each component in accordance with the processing result. The camera rotating unit 202 includes the panning unit 104 and the tilting unit 105, and rotates the camera 101 in the panning direction or in the tilting direction in accordance with the instruction from the CPU 201.

Figure 1:
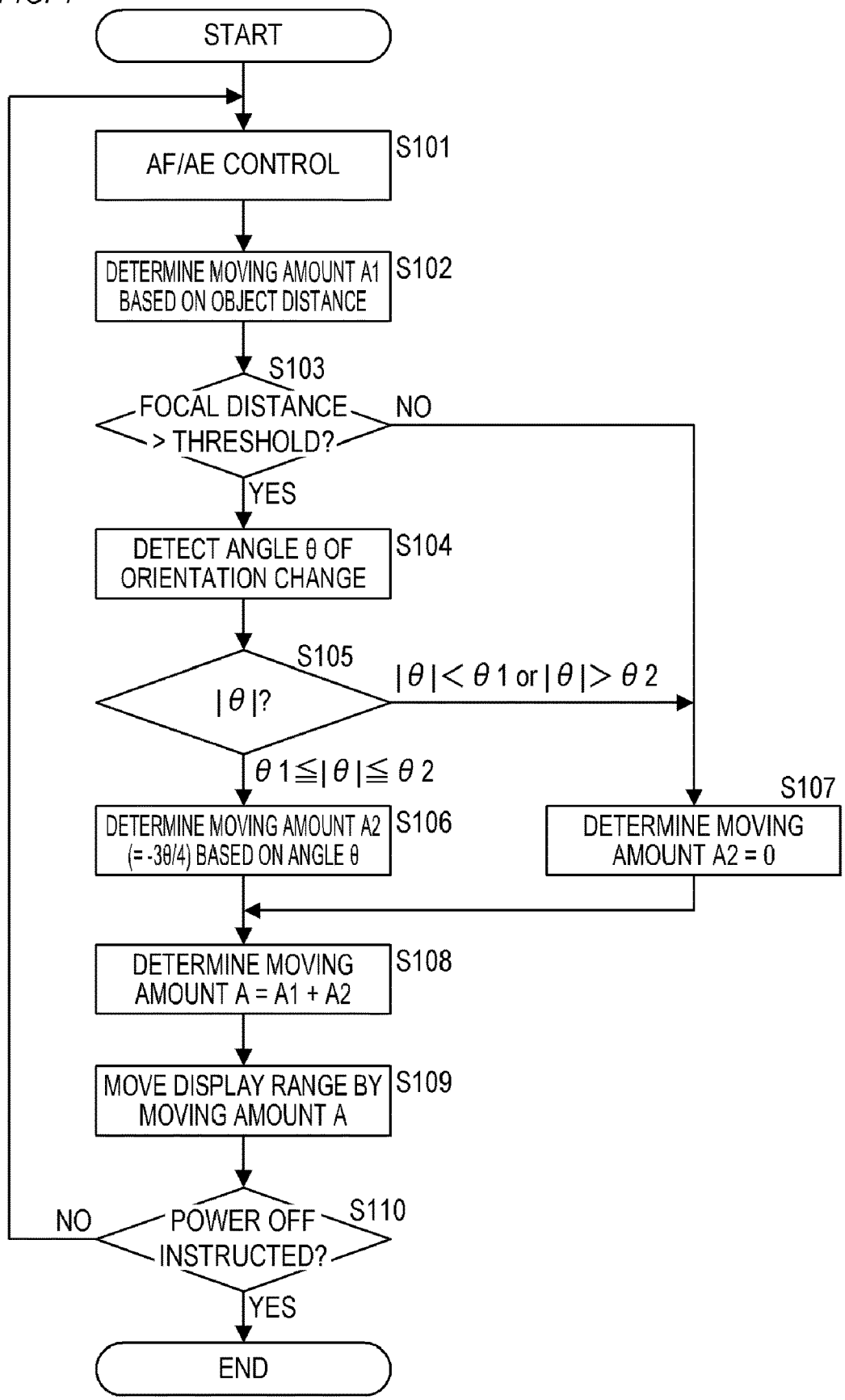
FIG. 1 is a flow chart depicting a processing flow according to Embodiment 1.

FIG. 1 is a flow chart depicting a processing flow (processing flow of the electronic binocular telescope 10) according to Embodiment 1. The processing flow in FIG. 1 is implemented, for example, by the CPU 201 developing a program, stored in ROM (not illustrated), in RAM (not illustrated), and executing the program. When the user operation to instruct the power ON of the electronic binocular telescope 10 is performed, the electronic binocular telescope 10 starts up and the processing, to display a part of the image captured by the camera 101 in the display range on the display (displays 102 and 103) in real-time, is started. Thereby the user can observe the object with viewing the image captured by the camera 101 and displayed on the display. Then the processing flow in FIG. 1 starts. The initial value of the focal distance of the camera 101 (focal distance immediately after power ON) is not especially limited, but is preferably a wide angel focal distance so that the user can easily detect the observation target. In Embodiment 1, it is assumed that the focal distance is controlled to 100 mm immediately after power ON. The focal distance is switched back and forth between 100 mm and 400 mm each time the user operation to instruct the change (switching) of the focal distance is performed during the processing flow in FIG. 1, although this step is not indicated in FIG. 1. It should be noted that in Embodiment 1, it is assumed that the camera 101 is fixed such that the optical axis of the camera 101 is parallel with the front face direction of the electronic binocular telescope 10 (direction in which the user wearing the electronic binocular telescope 10 is facing).

Figure 4A:
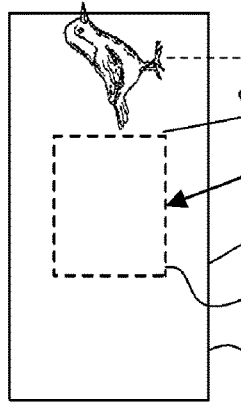
FIG. 4A to FIG. 4F are schematic diagrams illustrating a state of a display apparatus according to Embodiment 1.

FIG. 4A indicates the initial display direction (display direction immediately after power ON: reference direction). The display direction refers to a direction from the camera 101 to the object corresponding to the display range, such as a direction from the camera 101 to the object position corresponding to the center position of the display range. As illustrated in FIG. 4A, the reference direction is a direction matching with the optical axis of the camera 101, and is a direction parallel with the front direction of the electronic binocular telescope 10 (direction in which the user wearing the electronic binocular telescope 10 is facing). FIG. 4A illustrates a view of the head of the user from above, so that the panning direction components in the display direction can be seen, but the tilting direction components in the display direction is the same. In the following description, only the control to change the display direction (position in the display range) in the panning direction will be described, but the display direction can be changed in the tilting direction as well using the same control mode as the control mode of changing the display direction in the panning direction.

In S101 in FIG. 1, the camera 101 performs auto focus (AF) control and auto exposure (AE) control based on the captured image.

In S102, the camera 101 detects (acquires) the object distance L based on the result of the AF control in S101, and the CPU 201 determines (calculates) the moving amount A1 of the display range based on the detected object distance L.

Figure 5:
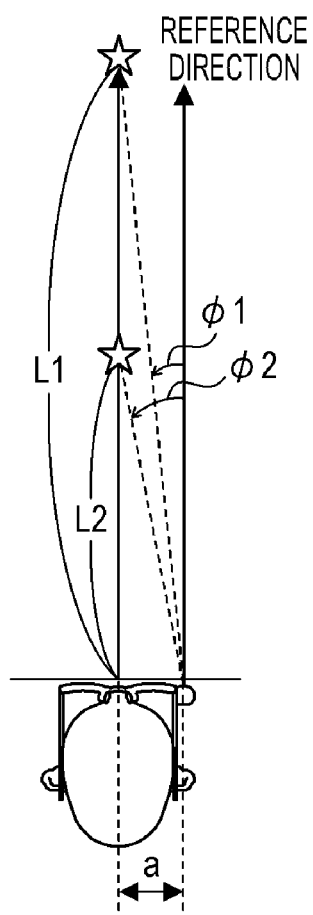
FIG. 5 is a schematic diagram illustrating a relationship between an object distance and a moving amount according to Embodiments 1 to 3.

FIG. 5 indicates the relationship between the object distance L and the moving amount A1. The star symbol in FIG. 5 indicates the observation target which exists in front of the user. In the case of observation with naked eyes, the user normally turns their face toward the object, and captures the object at the center of the visual field. Here a case where the display direction is the reference direction is considered. In this case, depending on the mounting position of the camera 101, the observation target which is captured at the center of the visual field of the user with naked eyes may not be displayed at the center of the display, and the user may experience irritation. The moving amount A1 determined in S102 is a moving amount to reduce such irritation. In Embodiment 1, it is assumed that the moving direction to the left is the positive direction, and the moving direction to the right is the negative direction. In FIG. 5, the camera 101 is installed at a position that deviates from the center of the head to the right side by the distance a. Therefore by moving the display range for a moving amount $A1=\varphi 1=\arctan(a/L1)$, the observation target existing at the object distance L1 (observation target that exists in front of the user) can be displayed at the center of the display. In the same manner, by moving the display range for a moving amount $A1=\varphi 2=\arctan(a/L2)$, the observation target existing at the object distance L2 (observation target that exists in front of the user) can be displayed at the center of the display. In this way, in S102, the moving amount A1, which is larger as the object distance is shorter, is determined based on the object distance L using the relational expression "A1=arctan (a/L)". According to this relational expression, the moving amount A1 becomes virtually zero when the object distance L is relatively long. Hence in the case of assuming that only objects at a far distance are observed, or in the case where the object distance L is longer than a predetermined distance, the moving amount A1 may be regarded as zero.

In S103, in FIG. 1, the CPU 201 determines whether the focal distance of the camera 101 is longer than a threshold (predetermined distance). Processing advances to S104 if the focal distance is more than the threshold, or to S107 if the focal distance is not more than the threshold. Processing may advance to S104 if the focal distance is not less than the threshold, or to S107 if the focal distance is less than the threshold. In Embodiment 1, the focal distance that can be set is 100 mm and 400 mm, hence in S103, it is determined whether the focal distance is 400 mm or less, and processing advances to S104 if the focal distance is 400 mm, or to S107 if the focal distance is 100 mm.

In S104, the CPU 201 detects the orientation of the electronic binocular telescope 10 (head of the user) using the gyro sensor 106, and detects the angle θ which indicates the change of the orientation.

In S105, the CPU 201 switches the processing in accordance with the angle θ (change of orientation of the electronic binocular telescope 10 (head of the user)) detected in S104. Specifically, in the electronic binocular telescope 10, two threshold values θ1 and θ2 have been stored in advance (0<θ1<θ2). In the case of |θ|<θ1, that is, in the case where the change amount of the orientation is smaller than a first amount, processing advances to S107. Processing also advances to S107 in the case of |θ|>θ2, that is, in the case where the change amount of the orientation is larger than a second amount. In the case of θ1≤|θ|≤θ2, that is, in the case where the change amount of the orientation is at least the first amount and not more than the second amount, processing advances to S106. In the case of |θ|=θ1 or |θ|=θ2, processing may advance to S107 instead of S106.

In S106, the CPU 201 determines (calculates) a moving amount A2 of the display range based on the angle θ (change of the orientation of the electronic binocular telescope 10 (head of the user)) detected in S104.

Figure 4B:
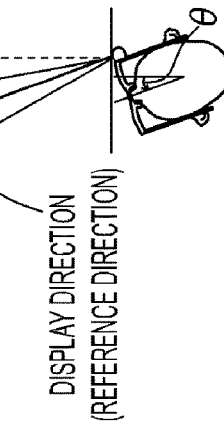

Here a case of not performing the moving control of the display range is considered. Specifically, a case where the display direction is a direction that constantly matches with the optical axis of the camera 101 and is parallel with the front direction of the electronic binocular telescope 10 (direction in which the user wearing the electronic binocular telescope 10 is facing) is considered. In this case, if the electronic binocular telescope 10 (head of the user) moves from the state in FIG. 4A by the angle θ, the display direction also moves by the angle θ, as illustrated in FIG. 4B.

Figure 4C:
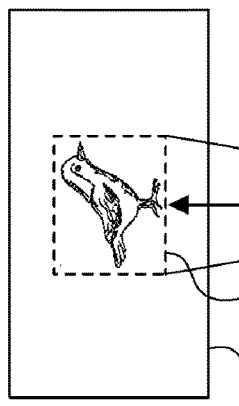

In S106, the CPU 201 determines the moving amount A2 based on the angle θ, so as to reduce the change of the display direction caused by the change of the orientation of the electronic binocular telescope 10 (head of the user). Specifically, the moving amount A2=−3θ/4 is determined such that the display direction moves by the angle θ/4, as illustrated in FIG. 4C. In other words, the moving amount A2 is determined so that the display range moves by ¾ the moving amount of electronic binocular telescope 10 (head of the user) in the direction opposite the moving direction of the electronic binocular telescope 10 (head of the user). As mentioned above, in Embodiment 1, the moving direction to the left is the positive direction, and the moving direction to the right is the negative direction. Therefore in the case where the electronic binocular telescope 10 (head of the user) turns to the left, the angle θ becomes a positive value, and the moving amount A2=−3θ/4 becomes a negative value. In the case where the electronic binocular telescope 10 (head of the user) turns to the right, the angle θ becomes a negative value, and the moving amount A2=−3θ/4 becomes a positive value. By reducing the change of the display direction caused by the change of the orientation of the electronic binocular telescope 10 (head of the user), it becomes easier to maintain the observation range (object range (angle of view) of the image displayed on the display) or to perform observation with changing the observation range slowly.

Figure 4D:
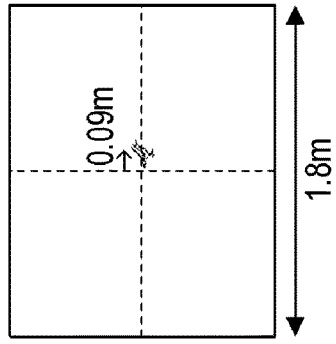
Figure 4E:
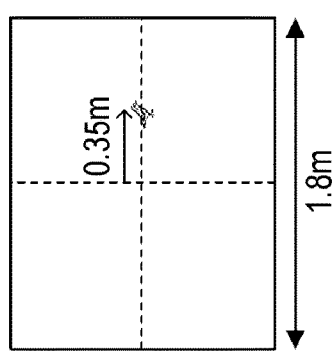
Figure 4F:
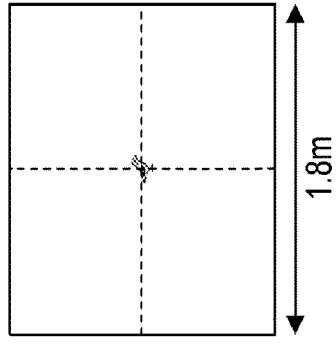

The above mentioned effect of the processing in S106 will be described more specifically. Here it is assumed that the image pickup element (image sensor) of the camera 101 is an image pickup element having a 35 mm full size (36 mm×24 mm), and the focal distance is 400 mm. Then it is assumed that a bird having about a 0.2 m body length located at a place 20 m away from the user (electronic binocular telescope 10; camera 101) is observed. In the case where the focal distance is 400 mm, the horizontal angle of view (angle of view in the horizontal direction (left-right direction)) in the observation range is about 5.15°. Therefore a horizontal width (width in the horizontal direction) of the observation range at a place 20 m away from the user becomes about 1.8 m (actual distance), and if an image of the bird is captured at the center of the observation range, an image illustrated in FIG. 4D is displayed. Here a case where the electronic binocular telescope 10 (head of the user) moved to the left by angle θ=1° is considered. In this case, if the moving control of the display range is not performed, the display direction also moves to the left by angle θ=1°, and the observation range moves to the left by about 0.35 m at a place 20 m away from the user, hence the image in FIG. 4E is displayed. In this way, even if the angle θ is small, the change of the observation range is large, and it becomes difficult to maintain the observation range or to perform observation with changing the observation range slowly. In the case of Embodiment 1, the angle of the change of the display direction is kept to ¼ the angle θ, hence the change of the observation range is suppressed, as illustrated in FIG. 4F, and it becomes easier to maintain the observation range or to perform observation with changing the observation range slowly.

Another effect of the processing in S106 will be described. In Embodiment 1, in the case of the focal distance 100 mm, the moving amount A2=0 that does not move the display range is determined (described in detail later). Therefore in the case of the focal distance 400 mm, if the angle of the change of the display direction is ¼ the angle θ by which the electronic binocular telescope 10 (head of the user) actually changed, the user can change the observation range with the same sensation as the case of the focal distance 100 mm. Specifically, if the angle θ is the same whether the focal distance is 100 mm or 400 mm, the change of the observation range (moving amount of the observation range) caused by the change of the electronic binocular telescope 10 (head of the user) thereof also becomes the same.

The moving amount A2 determined in S106 is not limited to −3θ/4. If the change of the display direction caused by the change of the orientation of the electronic binocular telescope 10 (head of the user) is reduced, it becomes easier to maintain the observation range or to perform observation with changing the observation range slowly. If the ratio of the change amount of the display direction to the change amount of the orientation of the electronic binocular telescope 10 (head of the user) (sensitivity value: ¼ in the above description) is smaller than 1, then the change of the display direction caused by the change of the orientation of the electronic binocular telescope 10 (head of the user) can be reduced. In the case where the moving control of the display range is not performed, the change of the observation range caused by the change of the electronic binocular telescope 10 (head of the user) is larger as the focal distance is longer. Therefore in the case where the focal distance is a second distance, which is longer than the first distance, it is preferable to reduce the change of the display direction caused by the orientation of the electronic binocular telescope 10 (head of the user), compared with the case where the focal distance is the first distance. In other words, in the case where the foal distance is the first distance, which is shorter than the second distance, it is preferable to increase the change of the display direction caused by the orientation of the electronic binocular telescope 10 (head of the user), compared with the case where the focal distance is the second distance. Moreover, it is further preferable to reduce the change of the display direction caused by the change of the orientation of the electronic binocular telescope 10 (head of the user) as the focal distance is longer. The first distance and the second distance are not especially limited, but in the above example, the first distance is 100 mm and the second distance is 400 mm. Furthermore, it is preferable that the above mentioned ratio (sensitivity value) is approximately the same as the ratio of the first distance to the focal distance. Thereby the observation range can be changed with the same sensation as the case where the focal distance is set to the first distance, and the moving control of the display range is not performed. In this case, if the minimum focal distance that can be set is used as the first distance, the observation range can be changed with the same sensation regardless the focal distance.

In S107 in FIG. 1, the CPU 201 determines the moving amount A2=0 that does not move the display range. Generally, in the case where the focal distance is short (in the case of a wide angle; corresponds to NO in S103), the change of the observation range caused by the unintended change of orientation of the electronic binocular telescope 10 (unintended motion of the head) does not stand out. In the case where $|\theta|<\theta 1$ is determined in S105, the change amount of the orientation of the electronic binocular telescope 10 (head of the user) is minimal, and the observation range is stable. In the case where $|\theta|>\theta 2$ is determined in S105, the user is more likely to have moved their head intentionally to change the observation range, and processing in S106 to suppress the change of the observation range is contrary to the intention of the user. Therefore in Embodiment 1, processing can advance to S107 in such a case.

It should be noted that the processing in S103 may be omitted in the case where the focal distance is assumed to be long (telescope focal distance; focal distance at which change of observation range caused by unintended change of the orientation of the electronic binocular telescope 10 tends to stand out), so that processing can advance to S104 or the like regardless the focal distance. Further, the processing in S105 may be omitted so that processing can advance to S106, regardless the change amount of the orientation of the electronic binocular telescope 10 (head of the user).

In S108 in FIG. 1, based on the moving amount A1 determined in S102 and the moving amount A2 determined in S106 or S107, the CPU 201 determines (calculates) the final moving amount A of the display range (A=A1+A2). If it is determined in advance that the moving amount A1 is zero, such as the case where only an object at long distance is assumed to be observed, the moving amount A=A2 may be determined regardless the object distance L, omitting the processing in S102.

In S109, the CPU 201 moves the display range by the moving amount A determined in S108.

In S110, the CPU 201 monitors the information from the operation member 107 and determines whether the user operation to instruct power OFF of the electronic binocular telescope 10 is performed. The processing steps in S101 to S109 are repeated until power OFF is instructed, and when power OFF is instructed, the processing flow in FIG. 1 ends and the electronic binocular telescope 10 stops (power of the electronic binocular telescope 10 is shut off).

As described above, according to Embodiment 1, the position of the display range is controlled based on the change of the orientation of the electronic binocular telescope 10 (head of the user). Thereby a stable observation can be more easily performed. Specifically, by reducing the change of the display direction caused by the change of the orientation of the electronic binocular telescope 10 (head of the user), it becomes easier to maintain the observation range or to perform observation with changing the observation range slowly.

In the processing flow in FIG. 1, the position of the display range may be constantly controlled based on the shaking of the electronic binocular telescope 10, such as by camera shake correction, beside the above mentioned control of the position of the display range. Specifically, the position of the display range may be constantly controlled so as to control the shaking of the display direction caused by the shaking of the electronic binocular telescope 10. Further, the shaking of the display direction (display position (object position corresponding to the display range, such as object position corresponding to the center position of the display range)) caused by the shaking of the electronic binocular telescope 10 in the front-back, up-down and left-right directions, when the orientation of the electronic binocular telescope 10 does not change, may be suppressed. Furthermore, the shaking of the display direction caused by the shaking of the orientation of the electronic binocular telescope 10 may be suppressed. Or both of these shakings may be suppressed. The shaking of the electronic binocular telescope 10 may be detected by the gyro sensor 106 or by a member (sensor) different from the gyro sensor 106. The method of detecting the shaking of the electronic binocular telescope 10 is not especially limited. For example, the shaking of a predetermined frequency (micro-vibration) may be detected so that the shaking of the display direction caused by this shaking is suppressed. Furthermore, based on a shake signal (detection result) outputted from the vibration sensor, it may be determined that vibration (camera shake) occurred when the value of the shake signal is less than a threshold, and it may be determined that an orientation change, that is not vibration, occurred when the value of the shake signal is the threshold or more. The vibration and the orientation change that is not vibration can be detected by discerning the difference between the two using various techniques, such as the technique disclosed in Japanese Patent Application Publication No. 2015-075697.

Instead of controlling the position of the display range based on the shaking of the electronic binocular telescope 10, the image capturing direction of the camera 101 may be controlled. Specifically, the image capturing direction may be controlled so as to suppress the shaking of the display direction caused by the shaking of the electronic binocular telescope 10.

In the same manner, the image capturing direction may be controlled instead of controlling the position of the display range based on the object distance L (movement by the moving amount A1).

The control mode of moving the display range in the panning direction may be different from the control mode of moving the display range in the tilting direction. For example, the control of the display range in one of the panning direction and the tilting direction may be performed at a first sensitivity value, and the control of the display range in the other of the panning direction and the tilting direction may be performed at a second sensitivity value, which is different from the first sensitivity value.

Embodiment 2

Embodiment 2 of the present invention will be described next. In Embodiment 1, a case of reducing the change of the display direction caused by the change of the orientation of the electronic binocular telescope 10 (head of the user) was described as an example. By this control, it becomes easier to maintain the observation range or to perform observation with changing the observation range slowly. However, in some cases, the user may desire to perform an observation tracking an observation target which moves quickly. Such an observation can be performed more easily by increasing the change of the display direction caused by the change of the orientation of the electronic binocular telescope 10 (head of the user). Therefore in Embodiment 2, an example of allowing an increase of the change of the display direction caused by the change of the orientation of the electronic binocular telescope 10 (head of the user) will be described. In the following, aspects (e.g. configuration, processing) that are different from Embodiment 1 will be described in detail, and description on aspects the same as Embodiment 1 will be omitted unless otherwise necessary.

Figure 6:
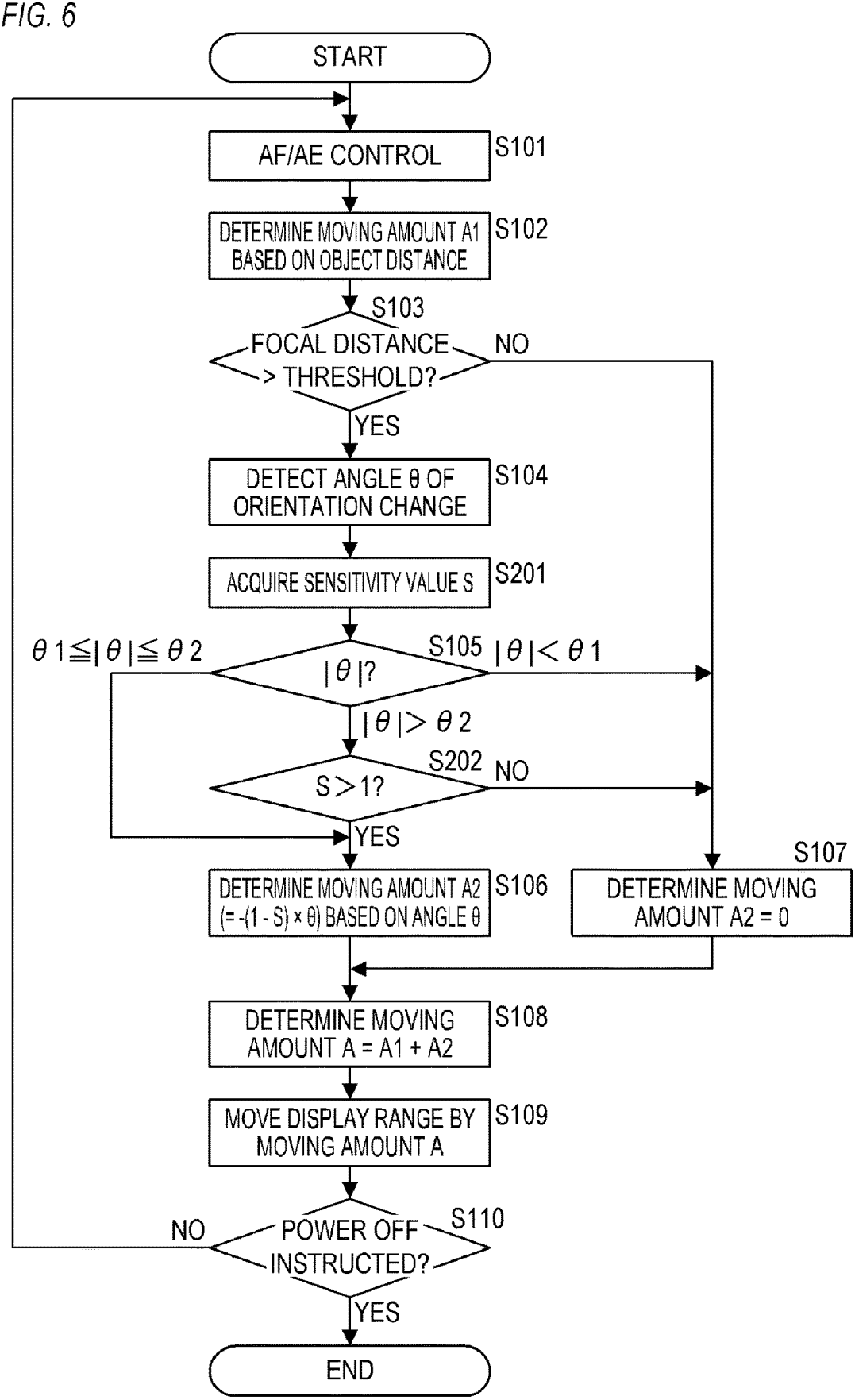
FIG. 6 is a flow chart depicting a processing flow according to Embodiment 2.

FIG. 6 is a flow chart depicting a processing flow (processing flow of the electronic binocular telescope 10) according to Embodiment 2, and is a modification of the flow chart in FIG. 1. In FIG. 6, a same processing step as FIG. 1 is denoted with a same reference sign as FIG. 1.

In S201, which is a step after S104, the CPU 201 reads a sensitivity value S (ratio of the change amount of the display direction to the change amount of the orientation of the electronic binocular telescope 10 (head of the user)) that is currently set, from a memory (e.g. ROM), which is not illustrated. A value that can be set as the sensitivity value S and a number of values that can be set are not especially limited, but in Embodiment 2, it is assumed that one of the values in the following 5 levels is set as the sensitivity value S. The method of setting the sensitivity value S is not especially limited either, but in Embodiment 2, it is assumed that the sensitivity value S is set in accordance with the user operation.

| Very insensitive | 1/4 |
| Insensitive | 1/2 |
| Standard | 1 |
| Sensitive | 1.2 |
| Very sensitive | 1.5 |

1, which corresponds to "Standard", is the sensitivity value at which the moving control of the display range, based on the change of the orientation of the electronic binocular telescope 10 (head of the user), is not performed. A value which corresponds to "Insensitive" or to "Very insensitive" (that is, a value smaller than 1) is a sensitivity value at which the change of the display direction, caused by the change of the orientation of the electronic binocular telescope 10 (head of the user) is reduced, and the change of the display direction, caused by the change of orientation of the electronic binocular telescope 10 (head of the user), becomes smaller as the sensitivity value is smaller. To maintain the observation range or to perform observation with changing the observation range slowly, it is preferable to set "Insensitive" (1/2) or "Very insensitive" (1/4). A value corresponding to "Sensitive" or "Very sensitive" (that is, a value larger than 1) is a sensitivity value at which the change of the display direction, caused by the change of the orientation of the electronic binocular telescope 10 (head of the user) is increased, and the change of the display direction, caused by the change of the orientation of the electronic binocular telescope 10 (head of the user), becomes larger as the sensitivity value is larger. To perform observation tracking an observation target which moves quickly, it is preferable to set "Sensitive" (1.2) or "Very sensitive" (1.4).

One sensitivity value S that is set may or may not be used for both the control of the display range in the panning direction and the control of the display range in the tilting direction. For example, the sensitivity value S1 that is used for the control of the display range in the panning direction, and the sensitivity value S2 that is used for the control of the display range in the tilting direction, may be independently set. Alternatively, a predetermined sensitivity value (e.g. 1) may be used for the control of the display range in one of the panning direction and the tilting direction, and a sensitivity value S, that is used for the control of the display range in the other of the panning direction and the tilting direction, may be set in accordance with the user operation or the like.

Description on FIG. 6 resumes here. In Embodiment 1, if |θ|>θ2 is determined in S105, processing advances to S107 so that the moving amount A2=0, at which the moving control of the display range is not performed, is determined. However, in the case of the observation to track an observation target which moves quickly, the observation target may be lost if the moving control of the display range is not performed, therefore it is preferable to perform the moving control of the display range so that the change of the display direction, caused by the change of the orientation of the electronic binocular telescope 10 (head of the user), increases. Hence in Embodiment 2, in the case where |θ|>θ2 is determined in S105, processing advances to S202 considering the possibility that the observation to track an observation target that moves quickly is active. In S202, the CPU 201 determines whether the sensitivity value S that is set is larger than 1. Processing advances to S106 if the sensitivity value S is larger than 1, since it is more likely that the observation to track an observation target that moves quickly is currently active. On the other hand, processing advances to S107 if the sensitivity value S is 1 or less, since it is less likely that the observation to track an observation target that moves quickly is currently active. The processing steps of S105 and S202 may be omitted, so that processing advances to S106 regardless the change amount of the orientation of the electronic binocular telescope 10 (head of the user). Further, the processing step of S202 may be omitted so that processing advances to S106 regardless the sensitivity value S.

In S106, the moving amount A2 is determined (calculated) based on the angle θ detected in S104, as in the case of Embodiment 1. In Embodiment 2, however, the moving amount A2=−(1−S)×θ is calculated based on the angle θ and the sensitivity value S. Therefore in the case of the sensitivity value S=1, the moving amount A2=0, at which the moving control of the display range is not performed, is calculated. In the case where the sensitivity value S is smaller than 1, a moving amount A2, of which absolute value is larger as the sensitivity value S is smaller and of which positive/negative sign is the opposite of the angle θ, is calculated. In other words, a moving amount A2, by which change of the display direction, caused by the change of the orientation of the electronic binocular telescope 10 (head of the user) is reduced as the sensitivity value S is smaller, is calculated. In the case where the sensitivity value S is larger than 1, a moving amount A2, of which absolute value is larger as the sensitivity value S is larger and of which positive/negative sign is the same as the angle θ, is calculated. In other words, a moving amount A2, by which change of the display direction, caused by the change of the orientation of the electronic binocular telescope 10 (head of the user) is increased as the sensitivity value S is larger, is calculated.

As described above, according to Embodiment 2, the change of the display direction, caused by the change of the orientation of the electronic binocular telescope 10 (head of the user), can be increased, hence the observation with tracking an observation target which moves quickly can be performed more easily. Furthermore, it can be set whether the change of the display direction, caused by the change of the orientation of the electronic binocular telescope 10 (head of the user) is reduced, increased or maintained, hence user friendless improves.

Embodiment 3

Embodiment 3 of the present invention will be described next. In Embodiment 1, a case where the focal distance of the camera 101 can be switched in 2 levels (100 mm and 400 mm) and the moving control of the display range based on the change of the orientation of the electronic binocular telescope 10 (head of the user) is not performed when the focal distance is set to 100 mm, was described as an example. In Embodiment 3, however, a case where the focal distance can be freely (continuously) changed in the 100 mm to 400 mm range will be described as an example. Further, a case where the sensitivity value S is set in accordance with the focal distance, and the moving control of the display range, based on the change of the orientation of the electronic binocular telescope 10 (head of the user), can be performed even if the focal distance is set to 100 mm, which is the wide angle end (minimum focal distance), will be described as an example. In the following, aspects (e.g. configuration, processing) that are different from Embodiment 1 will be described in detail, and description on aspects the same as Embodiment 1 will be omitted unless otherwise necessary.

Figure 7:
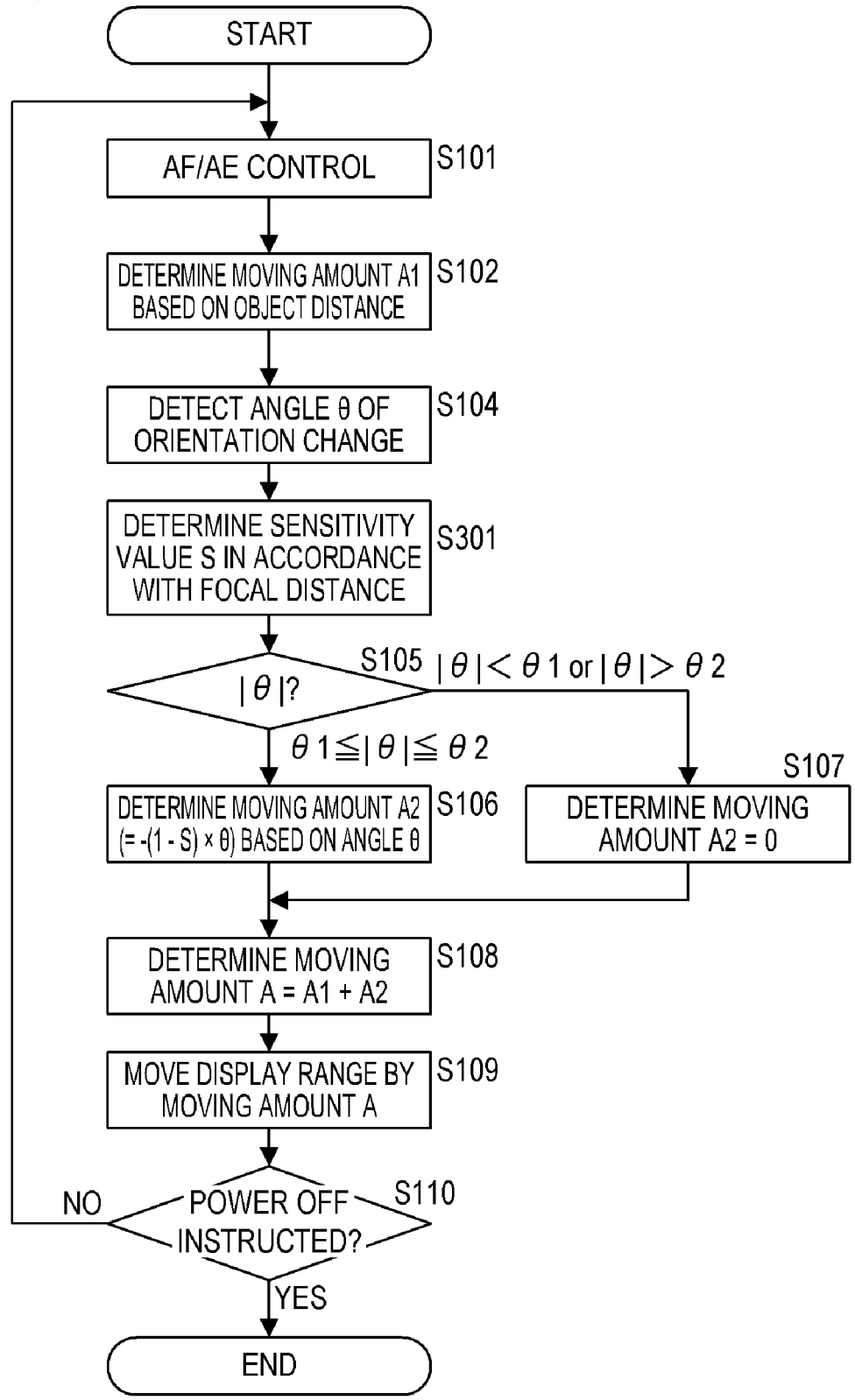
FIG. 7 is a flow chart depicting a processing flow according to Embodiment 3.

FIG. 7 is a flow chart depicting a processing flow (processing flow of the electronic binocular telescope 10) according to Embodiment 3, and is a modification of the flow chart in FIG. 1. In FIG. 7, a same processing step as FIG. 1 is denoted with a same reference sign as FIG. 1. The processing step in S103 is omitted so that the moving control of the display range, based on the change of the orientation of the electronic binocular telescope 10 (head of the user), can be performed regardless the focal distance.

In S301, which is a step after S104, the CPU 201 determines (calculates) the sensitivity value S in accordance with the focal distance of the camera 101. In S106, the moving amount A2 is determined (calculated) based on the angle θ detected in S104, as in the case of Embodiment 1.

In Embodiment 3, however, the moving amount A2=−(1−S)×θ is calculated based on the angle θ and the sensitivity value S.

The method of determining the sensitivity value S in accordance with the current focal distance is not especially limited, and, for example, the method of using information (e.g. table, function) that indicates the correspondence between the focal distance and the sensitivity value S may be used. A specific correspondence between the focal distance and the sensitivity value S, a specific value of the focal distance, a specific value of the sensitivity value S in accordance with the focal distance, and the like, are not especially limited either. In Embodiment 3, it is assumed that the reference focal distance is 50 mm (which corresponds to the angle of view of human eyes), and the ratio of the reference focal distance to the current focal distance is determined as the sensitivity value S. For example, in the case where the focal distance of the camera 101 is set to 100 mm, the sensitivity value S=50/100=½ is determined in S301, and the moving amount A2=−(1−(½))×θ=−θ/2 is determined in S106. In the same manner, in the case where the focal distance of the camera 101 is set to 300 mm, the sensitivity value S=50/300=⅙ is determined in S301, and the moving amount A2=−(1−(⅙))×θ=−5θ/6 is determined in S106.

As described above, according to Embodiment 3, at each focal distance a sensitivity value S in accordance with the corresponding focal distance is determined, and the moving control of the display range is performed with the determined sensitivity value S. Thereby stable observation can be more easily performed regardless the focal distance.

Embodiment 4

Embodiment 4 of the present invention will be described next. In the following, aspects (e.g. configuration, processing) that are different from Embodiment 1 will be described in detail, and description on aspects the same as Embodiment 1 will be omitted unless otherwise necessary. In Embodiment 4, the displays 102 and 103 display an image (e.g. entire image) captured by the camera 101.

Figure 8:
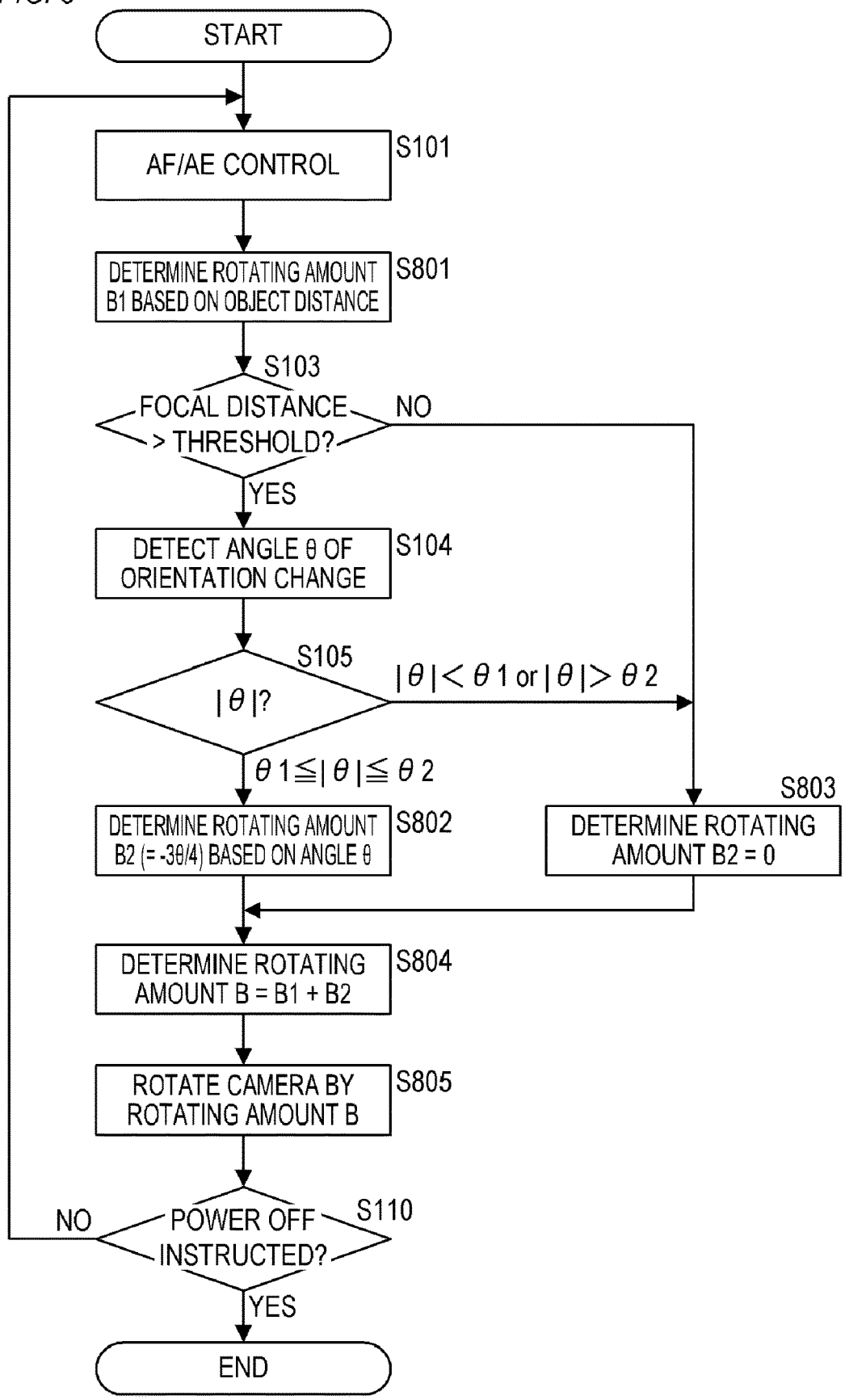
FIG. 8 is a flow chart depicting a processing flow according to Embodiment 4.

FIG. 8 is a flow chart depicting a processing flow (processing flow of the electronic binocular telescope 10) according to Embodiment 4, and is a modification of the flow chart in FIG. 1. In FIG. 8, a same processing step as FIG. 1 is denoted with a same reference sign as FIG. 1.

Figure 9C:
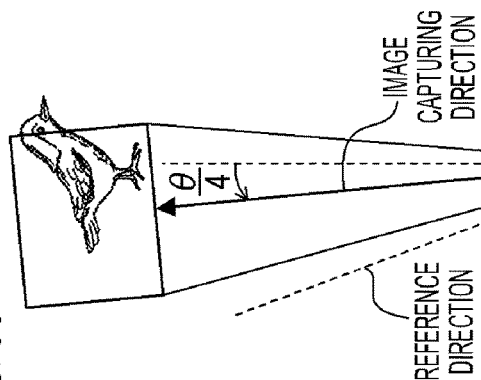
FIG. 9A to FIG. 9F are schematic diagrams illustrating a state of a display apparatus according to Embodiment 4.
Figure 9F:
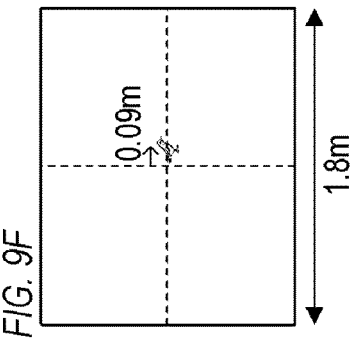
Figure 9B:
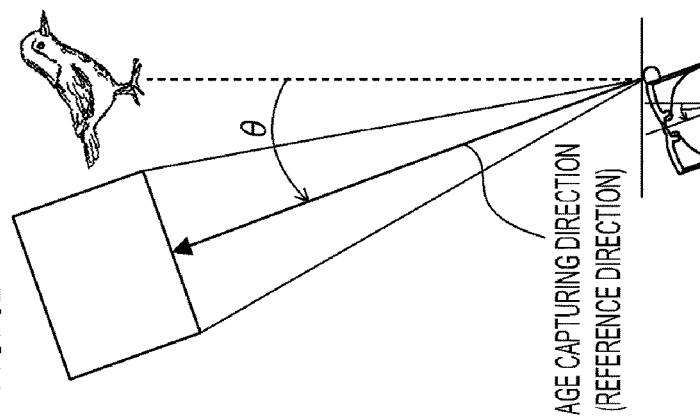
Figure 9E:
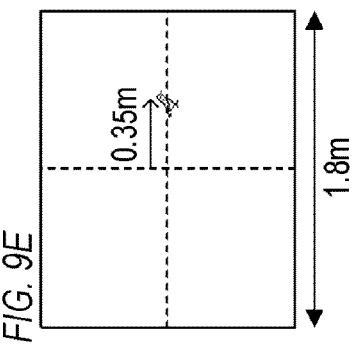
Figure 9A:
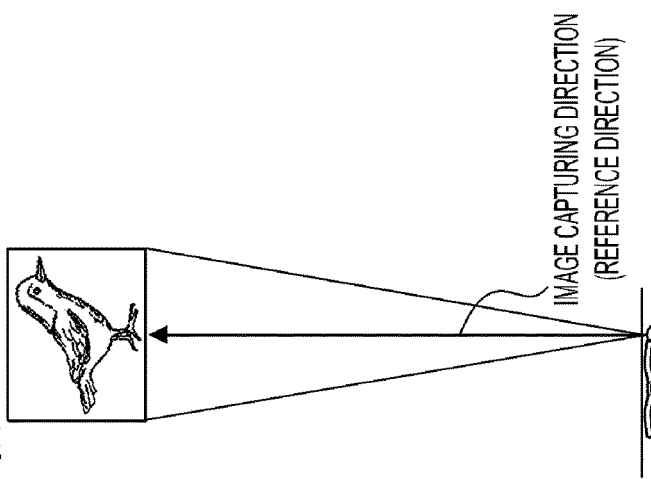

FIG. 9A indicates the initial direction of the image capturing direction of the camera 101 (image capturing direction immediately after power ON: reference direction). As illustrated in FIG. 9A, the reference direction is a direction in which the optical axis of the camera 101 is parallel with the front direction of the electronic binocular telescope 10 (direction the user wearing the electronic binocular telescope 10 is facing). FIG. 9A illustrates a view of the head of the user from above, so that the panning direction components in the image capturing direction can be viewed, but the tilting direction components in the image capturing direction are the same. In the following description, only the control to change the image capturing direction in the panning direction will be described, but the image capturing direction can be changed in the tilting direction as well, using the same mode as the control mode of changing the image capturing direction in the panning direction.

In FIG. 8, the processing steps S801 and S802 to S805 are performed instead of the processing steps S102 and S106 to S109 in FIG. 1.

In S801, the camera 101 detects (acquires) the object distance L based on the result of the AF control in S101, and the CPU 201 determines (calculates) the rotating amount B1 of the camera 101 based on the detected object distance L.

Figure 10:
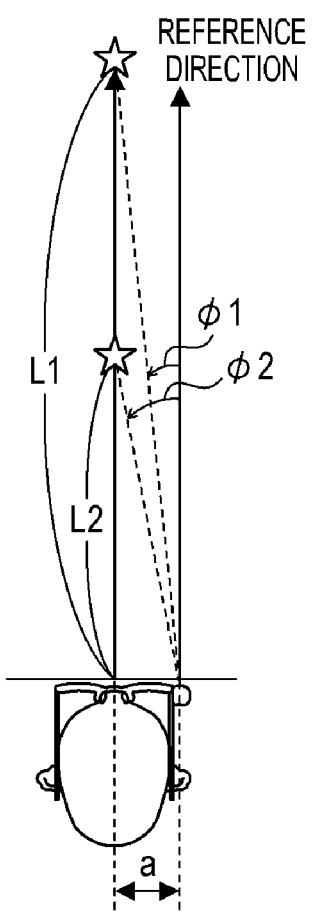
FIG. 10 is a schematic diagram illustrating a relationship between an object distance and a rotating amount according to Embodiments 4 to 6.

FIG. 10 indicates the relationship between the object distance L and the rotating amount B1. The star symbol in FIG. 10 indicates the observation target which exists in front of the user. In the case of observation with naked eyes, the user normally turns their face toward the object, and captures the object at the center of the visual field. Here a case where the image capturing direction of the camera 101 is the reference direction is considered. In this case, depending on the mounting position of the camera 101, the observation target which is captured at the center of the visual field of the user with naked eyes may not be displayed at the center of the display, and the user may experience irritation. The rotating amount B1 determined in S801 is a rotating amount to reduce such irritation. In Embodiment 4, it is assumed that the rotating direction to the left is the positive direction, and the rotating direction to the right is the negative direction. In FIG. 10, the camera 101 is installed at a position that deviates from the center of the head to the right by the distance a. Therefore by rotating the camera 101 for a rotating amount B1=φ1=arctan (a/L1), the observation target that exists at the object distance L1 (observation target that exists in front of the user) can be displayed at the center of the display. In the same manner, by rotating the camera 101 for a rotating amount B1=φ2=arctan (a/L2), the observation target that exist at the object distance L2 (observation target that exists directly in front of the user) can be displayed at the center of the display. In this way, in S801, the rotating amount B1, which is larger as the object distance is shorter, is determined based on the object distance L using the relational expression "B1=arctan (a/L)". According to this relational expression, the rotating amount B1 becomes virtually zero when the object distance L is relatively long. Hence in the case of assuming that only objects at a far distance are observed, or in the case where the object distance L is longer than a predetermined distance, the rotating amount B1 may be regarded as zero.

In S802 in FIG. 8, the CPU 201 determines (calculates) the rotating amount B2 of the camera 101 based on the angle θ (change of the orientation of the electronic binocular telescope 10 (head of the user)) detected in S104.

Here a case of not performing the rotating control of the camera 101 is considered. Specifically, a case where the camera 101 is fixed such that the optical axis of the camera 101 is parallel with the front direction of the electronic binocular telescope 10 (direction in which the user wearing the electronic binocular telescope 10 is facing) is considered. In this case, if the electronic binocular telescope 10 (head of the user) moves from the state in FIG. 9A by the angle θ, the image capturing direction of the camera 101 also moves by angle θ, as illustrated in FIG. 9B.

In S802, the CPU 201 determines the rotating amount B2 based on the angle θ, so as to reduce the change of the image capturing direction caused by the change of the orientation of the electronic binocular telescope 10 (head of the user). Specifically, the rotating amount B2=−3θ/4 is determined such that the image capturing direction of the camera 101 moves by the angle θ/4, as illustrated in FIG. 9C. In other words, the rotating amount B2 is determined so that the camera 101 moves by ¾ the moving amount (value) of the electronic binocular telescope 10 (head of the user) in the direction opposite the moving direction of the electronic binocular telescope 10 (head of the user). As mentioned above, in Embodiment 4, the rotating direction to the left is the positive direction, and the moving direction to the right is the negative direction. Therefore in the case where the electronic binocular telescope 10 (head of the user) turns to the left, the angle θ becomes a positive value, and the rotating amount B2=−3θ/4 becomes a negative value. In the case where the electronic binocular telescope 10 (head of the user) turns to the right, the angle θ becomes a negative value, and the rotating amount B2=−3θ/4 becomes a positive value. By reducing the change of the image capturing direction caused by the change of the orientation of the electronic binocular telescope 10 (head of the user), it becomes easier to maintain the observation range (object range (angle of view) of the image displayed on the display) or to perform observation with changing the observation range slowly.

Figure 9D:
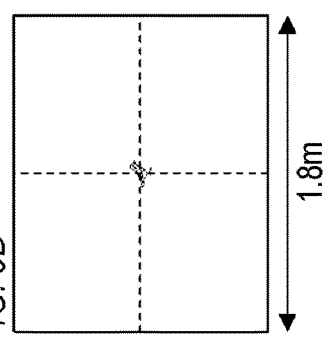

The above mentioned effect of the processing in S802 will be described more specifically. Here it is assumed that the image pickup element (image sensor) of the camera 101 is an image pickup element having a 35 mm full size (36 mm×24 mm), and the focal distance is 400 mm. Then it is assumed that a bird having about a 0.2 m body length located at a place 20 m away from the user (electronic binocular telescope 10; camera 101) is observed. In the case where the focal distance is 400 mm, the horizontal angle of view (angle of view in the horizontal direction (left-right direction)) in the observation range is about 5.15°. Therefore a horizontal width (width in the horizontal direction) of the observation range at a place 20 m away from the user becomes about 1.8 m (actual distance), and if an image of the bird is captured at the center of the observation range, an image illustrated in FIG. 9D is displayed. Here a case where the electronic binocular telescope 10 (head of the user) moved to the left by angle θ=1° is considered. In this case, if the rotating control of the camera 101 is not performed, the image capturing direction of the camera 101 also moves to the left by angle θ=1°, and the observation range moves to the left by about 0.35 m at a place 20 m away from the user, hence the image in FIG. 9E is displayed. In this way, even if the angle θ is small, the change of the observation range is large, and it becomes difficult to maintain the observation range or to perform observation with changing the observation range slowly. In the case of Embodiment 4, the angle of the change of the image capturing direction of the camera 101 is kept to ¼ the angle θ, hence the change of the observation range is suppressed, as illustrated in FIG. 9F, and it becomes easier to maintain the observation range or to perform observation with changing the observation range slowly.

Another effect of the processing in S802 will be described. In Embodiment 4, in the case of the focal distance 100 mm, the rotating amount B2=0 that does not rotate the camera 101 is determined (described in detail later). Therefore in the case of the focal distance 400 mm, if the angle of the change of the image capturing direction of the camera 101 is ¼ the angle θ by which the electronic binocular telescope 10 (head of the user) actually changed, the user can change the observation range with the same sensation as the case of the focal distance 100 mm. Specifically, if the angle θ is the same whether the focal distance is 100 mm or 400 mm, the change of the observation range (moving amount of the observation range) caused by the change of the electronic binocular telescope 10 (head of the user) thereof also becomes the same.

The rotating amount B2 determined in S802 is not limited to −3θ/4. If the change of the image capturing direction caused by the change of the orientation of the electronic binocular telescope 10 (head of the user) is reduced, it becomes easier to maintain the observation range or to perform observation with changing the observation range slowly. If the ratio of the changing amount of the image capturing direction of the camera 101 to the change amount of the orientation of the electronic binocular telescope 10 (head of the user) (sensitivity value: ¼ in the above description) is smaller than 1, then the change of the image capturing direction caused by the change of the orientation of the electronic binocular telescope 10 (head of the user) can be reduced. In the case where the rotating control of the camera 101 is not performed, the change of the observation range caused by the change of the electronic binocular telescope 10 (head of the user) is larger as the focal distance is longer. Therefore in the case where the focal distance is a second distance, which is longer than the first distance, it is preferable to reduce the change of the image capturing direction caused by the orientation of the electronic binocular telescope 10 (head of the user), compared with the case where the focal distance is the first distance. In other words, in the case where the focal distance is the first distance, which is shorter than the second distance, it is preferable to increase the change of the image capturing direction caused by the orientation of the electronic binocular telescope 10 (head of the user), compared with the case where the focal distance is the second distance. Moreover, it is further preferable to reduce the change of the image capturing direction caused by the change of the orientation of the electronic binocular telescope 10 (head of the user) as the focal distance is longer. The first distance and the second distance are not especially limited, but in the above example, the first distance is 100 mm and the second distance is 400 mm. Furthermore, it is preferable that the above mentioned ratio (sensitivity value) is approximately the same as the ratio of the first distance to the focal distance. Thereby the observation range can be changed with the same sensation as the case where the focal distance is set to the first distance, and the rotating control of the camera 101 is not performed. In this case, if the minimum focal distance that can be set is used as the first distance, the observation range can be changed with the same sensation regardless the focal distance.

In S803 in FIG. 8, the CPU 201 determines the rotating amount B2=0 that does not rotate the camera 101. Generally in the case where the focal distance is short (in the case of a wide angle; corresponds to NO in S103), the change of the observation angle caused by the unintended change of orientation of the electronic binocular telescope 10 (unintended motion of the head) does not stand out. In the case where |θ|<θ1 is determined in S105, the change amount of the orientation of the electronic binocular telescope 10 (head of the user) is minimal, and the observation range is stable. In the case where |θ|>θ2 is determined in S105, the user is more likely to have moved their head intentionally to change the observation range, and processing in S802 to suppress the change of the observation range is contrary to the intention of the user. Therefore in Embodiment 4, processing can advance to S803 in such a case.

It should be noted that the processing in S103 may be omitted in the case where the focal distance is assumed to be long (telescope focal distance; focal distance at which change of the observation range caused by unintended change of orientation of the electronic binocular telescope 10 tends to stand out), so that processing can advance to S104 or the like regardless the focal distance. Further, the processing in S105 may be omitted so that processing can advance to S802 regardless the change amount of the orientation of the electronic binocular telescope 10 (head of the user).

In S804 in FIG. 8, based on the rotating amount B1 determined in S801 and the rotating amount B2 determined in S802 or S803, the CPU 201 determines (calculates) the final rotating amount B=B1+B2 of the camera 101. If it is determined in advance that the rotating amount B1 is zero, such as the case where only an object at long distance is assumed to be observed, the rotating amount B=B2 may be determined regardless the object distance L, omitting the processing in S801.

In S805, the CPU 201 rotates the camera 101 by the rotating amount B determined in S804 using the camera rotating unit 202.

As described above, according to Embodiment 4, the image capturing direction of the camera 101 is controlled based on the change of the orientation of the electronic binocular telescope 10 (head of the user). Thereby a stable observation can be more easily performed. Specifically, by reducing the change of the image capturing direction caused by the change of the orientation of the electronic binocular telescope 10 (head of the user), it becomes easier to maintain the observation range or to perform observation with changing the observation range slowly.

In the processing flow in FIG. 8, the image capturing direction may be constantly controlled based on the shaking of the electronic binocular telescope 10, such as by camera shake correction, besides the above mentioned control of the image capturing direction. Specifically, the image capturing direction may be constantly controlled so as to control the shaking in the image capturing direction caused by the shaking of the electronic binocular telescope 10. Further, the shaking of the image capturing direction (image capturing position (object position corresponding to the image capturing range, such as object position corresponding to the center position of the image capturing range; optical axis position of the camera 101)) caused by the shaking of the electronic binocular telescope 10 in the front-back, up-down or left-right directions, when the orientation of the electronic binocular telescope 10 does not change, may be suppressed, or the shaking of the image capturing direction caused by the shaking of the electronic binocular telescope 10 may be suppressed, or both shakings may be suppressed. The shaking of the electronic binocular telescope 10 may be detected by the gyro sensor 106, or by a member (sensor) different from the gyro sensor 106. The method of detecting the shaking of the electronic binocular telescope 10 is not especially limited. For example, the shaking of a predetermined frequency (micro vibration) may be detected so that the shaking of the image capturing direction caused by this shaking is suppressed. Furthermore, based on a shake signal (detection result) outputted from the vibration sensor, it may be determined that vibration (camera shake) occurred when the value of the shake signal is less than a threshold, and it may be determined that an orientation change that is not a vibration occurred when the value of the shake signal is the threshold or more. The vibration and the orientation change that is not vibration can be detected by discerning the difference between the two using various techniques, such as the technique disclosed in Japanese Patent Application Publication No. 2015-075697.

A possible configuration is that a part of a captured image is selected as a display range and displayed on the display. In this case, the position of the display range may be controlled instead of controlling the image capturing direction based on the shaking of the electronic binocular telescope 10. Specifically, the position of the display range may be controlled so as to suppress the shaking of the display direction caused by the shaking of the electronic binocular telescope 10 (direction from the camera 101 to the object corresponding to the display range; e.g. direction from the camera 101 to the object position which corresponds to the center position of the display range).

In the same manner, in the case of displaying a part of the captured image is selected as a display range and displayed on the display, the position of the display range may be controlled instead of controlling the image capturing direction based on the object distance L (rotation by the rotating amount B1).

The control mode of changing the image capturing direction in the panning direction may be different from the control mode of changing the image capturing direction in the tilting direction. For example, the control of the image capturing direction in one of the panning direction and the tilting direction may be performed at a first sensitivity value, and the control of the image capturing direction in the other of the panning direction and the tilting direction may be performed at a second sensitivity value, which is different from the first sensitivity value.

Embodiment 5

Embodiment 5 of the present invention will be described next. In Embodiment 4, a case of reducing the change of the image capturing direction caused by the change of the orientation of the electronic binocular telescope 10 (head of the user) was described as an example. By this control, it becomes easier to maintain the observation range or to perform observation with changing the observation range slowly. However, in some cases, the user may desire to perform an observation with tracking an observation target that moves quickly. Such an observation can be performed more easily by increasing the change of the image capturing direction caused by the change of the orientation of the electronic binocular telescope 10 (head of the user). Therefore in Embodiment 5, an example of allowing an increase of the change of the image capturing direction caused by the change of the orientation of the electronic binocular telescope 10 (head of the user) will be described. In the following, aspects (e.g. configuration, processing) that are different from Embodiment 4 will be described in detail, and description on aspects the same as Embodiment 4 will be omitted unless otherwise necessary.

Figure 11:
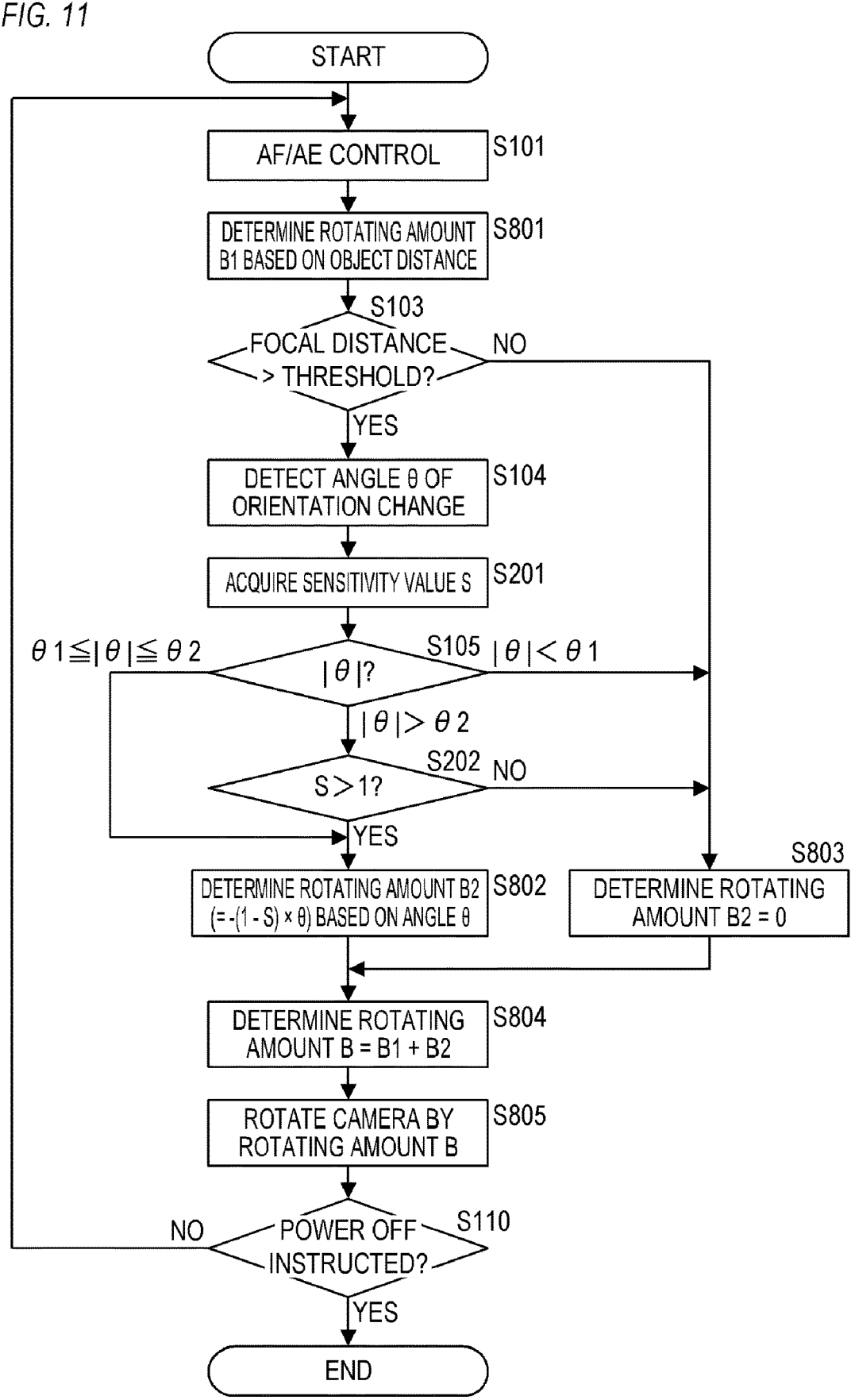
FIG. 11 is a flow chart depicting a processing flow according to Embodiment 5.

FIG. 11 is a flow chart depicting a processing flow (processing flow of the electronic binocular telescope 10) according to Embodiment 5, and is a modification of the flow chart in FIG. 8. In FIG. 11, a same processing step as FIG. 8 is denoted with a same reference sign as FIG. 8.

In S201, which is a step after S104, the CPU 201 reads a sensitivity value S (ratio of the change amount of the image capturing direction to the change amount of the orientation of the electronic binocular telescope 10 (head of the user)) that is currently set, from a memory (e.g. ROM), which is not illustrated. A value that can be set as the sensitivity value S and a number of values that can be set are not especially limited, but in Embodiment 5, it is assumed that one of the values in the following 5 levels is set as the sensitivity value S. The method of setting the sensitivity value S is not especially limited either, but in Embodiment 5, it is assumed that sensitivity value S is set in accordance with the user operation.

| Very insensitive | 1/4 |
| Insensitive | 1/2 |

-continued

| Standard | 1 |
| Sensitive | 1.2 |
| Very sensitive | 1.5 |

1, which corresponds to "Standard", is the sensitivity value at which the rotating control of the camera 101, based on the change of the orientation of the electronic binocular telescope 10 (head of the user), is not performed. A value which corresponds to "Insensitive" or to "Very insensitive" (that is, a value smaller than 1) is a sensitivity value at which the change of the image capturing direction, caused by the change of the orientation of the electronic binocular telescope 10 (head of the user), is reduced, and the change of the image capturing direction, caused by the change of orientation of the electronic binocular telescope 10 (head of the user), becomes smaller as the sensitivity value is smaller. To maintain the observation range or to perform observation with changing the observation range slowly, it is preferable to set "Insensitive" (1/2) or "Very insensitive" (1/4). A value corresponding to "Sensitive" or "Very sensitive" (that is, a value larger than 1) is a sensitivity value at which the change of the image capturing direction, caused by the change of the orientation of the electronic binocular telescope 10 (head of the user) is increased, and the change of the image capturing direction, caused by the change of the orientation of the electronic binocular telescope 10 (head of the user), becomes larger as the sensitivity value is larger. To perform observation tracking an observation target which moves quickly, it is preferable to set "Sensitive" (1.2) or "Very sensitive" (1.4).

One sensitivity value S that is set may or may not be used for both the control of the image capturing direction in the panning direction and the control of the image capturing direction in the tilting direction. For example, the sensitivity value S1 that is used for the control of the image capturing direction in the panning direction, and the sensitivity value S2 that is used for the control of the image capturing direction in the tilting direction, may be independently set. Alternatively, a predetermined sensitivity value (e.g. 1) may be used for the control of the image capturing direction in one of the panning direction and the tilting direction, and a sensitivity value S that is used for the control of the image capturing direction in the other of the panning direction and the tilting direction may be set in accordance with the user operation or the like.

Description on FIG. 11 resumes here. In Embodiment 4, if |θ|>θ2 is determined in S105, processing advances to S803 so that the rotating amount B2=0, at which the rotating control of the camera 101 is not performed, is determined. However, in the case of the observation to track an observation target which moves quickly, the observation target may be lost if the rotating control of the camera 101 is not performed, therefore it is preferable to perform the rotating control of the camera 101 so that the change of the image capturing direction caused by the change of the orientation of the electronic binocular telescope 10 (head of the user) increases. Hence in Embodiment 5, in the case where |θ|>θ2 is determined in S105, processing advances to S202 considering the possibility that the observation to track an observation target that moves quickly is currently active. In S202, the CPU 201 determines whether the sensitivity value S that is set is larger than 1. Processing advances to S802 if the sensitivity value S is larger than 1, since it is more likely that the observation to track an observation target that moves quickly is currently active. On the other hand, processing advances to S803 if the sensitivity value S is 1 or less, since it is less likely that the observation to track an observation target that moves quickly is currently active. The processing steps S105 and S202 may be omitted so that processing advances to S802 regardless the change amount of the orientation of the electronic binocular telescope 10 (head of the user). Further, the processing step of S202 may be omitted so that processing advances to S802 regardless the sensitivity value S.

In S802, the rotating amount B2 is determined (calculated) based on the angle θ detected in S104, as in the case of Embodiment 4. In Embodiment 5, however, the rotating amount B2=−(1−S)×θ is calculated based on the angle θ and the sensitivity value S. Therefore in the case of the sensitivity value S=1, the rotating amount B2=0, at which the rotating control of the camera 101 is not performed, is calculated. In the case where the sensitivity value S is smaller than 1, the rotating amount B2, of which absolute value is larger as the sensitivity value S is smaller and of which positive/negative sign is opposite of the angle θ, is calculated. In other words, a rotating amount B2, by which change of the image capturing direction caused by the change of the orientation of the electronic binocular telescope 10 (head of the user) is reduced as the sensitivity value S is smaller, is calculated. In the case where the sensitivity value S is larger than 1, a rotating amount B2, of which absolute value is larger as the sensitivity value S is larger and of which positive/negative sign is the same as the angle θ, is calculated. In other words, a rotating amount B2, by which change of the image capturing direction caused by the change of the orientation of the electronic binocular telescope 10 (head of the user) is increased as the sensitivity value S is larger, is calculated.

As described above, according to Embodiment 5, the change of the image capturing direction caused by the change of the orientation of the electronic binocular telescope 10 (head of the user) can be increased, hence the observation with tracking an observation target that moves quickly can be performed more easily. Furthermore, it can be set whether the change of the image capturing direction caused by the change of the orientation of the electronic binocular telescope 10 (head of the user) is reduced, increased or maintained, hence user friendliness improves.

Embodiment 6

Embodiment 6 of the present invention will be described next. In Embodiment 4, a case where the focal distance of the camera 101 can be switched in 2 levels (100 mm and 400 mm) and the rotating control of the camera 101 based on the change of the orientation of the electronic binocular telescope 10 (head of the user) is not performed when the focal distance is set to 100 mm, was described as an example. In Embodiment 6, however, a case where the focal distance can be freely (continuously) changed in the 100 mm to 400 mm range will be described as an example. Further, a case where the sensitivity value S is set in accordance with the focal distance, and the rotating control of the camera 101, based on the change of the orientation of the electronic binocular telescope 10 (head of the user), can be performed, even if the focal distance is set to 100 mm, which is the wide angle end (minimum focal distance), will be described as an example. In the following, aspects (e.g. configuration, processing) that are different from Embodiment 4 will be described in detail, and description on aspects the same as Embodiment 4 will be omitted unless otherwise necessary.

Figure 12:
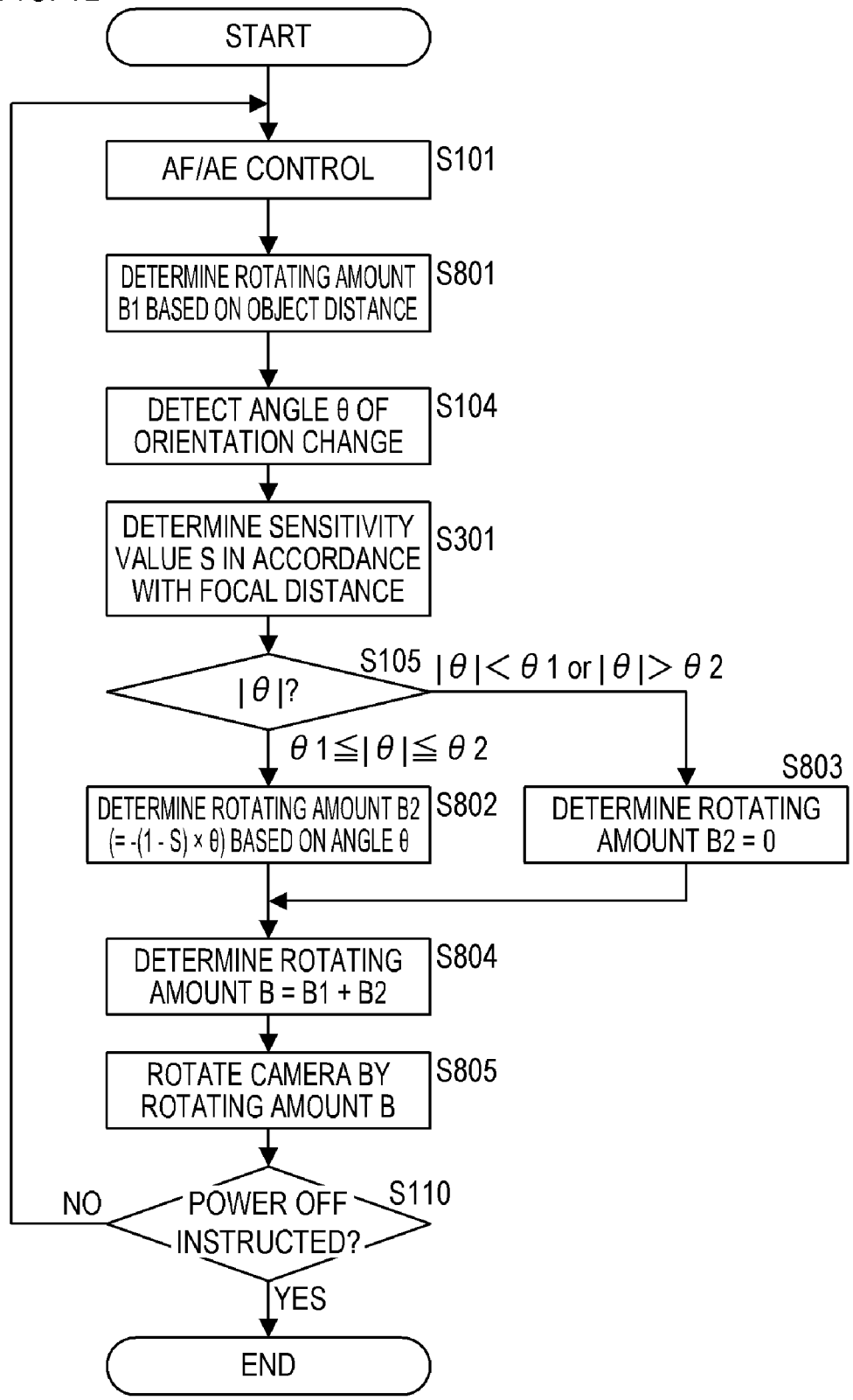
FIG. 12 is a flow chart depicting a processing flow according to Embodiment 6.

FIG. 12 is a flow chart depicting a processing flow (the processing flow of the electronic binocular telescope 10) according to Embodiment 6, and is a modification of the flow chart in FIG. 8. In FIG. 12, a same processing step as FIG. 8 is denoted with a same reference sign as FIG. 8. The processing step in S103 is omitted so that the rotating control of the camera 101 based on the change of the orientation of the electronic binocular telescope 10 (head of the user) can be performed regardless the focal distance.

In S301, which a step after S104, the CPU 201 determines (calculates) the sensitivity value S in accordance with the focal distance of the camera 101. In S802, the rotating amount B2 is determined (calculated) based on the angle θ detected in S104, as in the case of Embodiment 4. In Embodiment 6, however, the rotating amount B2=−(1−S)×θ is calculated based on the angle θ and the sensitivity value S.

The method of determining the sensitivity value S in accordance with the current focal distance is not especially limited, and, for example, the method of using information (e.g. table, function) that indicates the correspondence between the focal distance and the sensitivity value S may be used. A specific correspondence between the focal distance and the sensitivity value S, a specific value of the focal distance, a specific value of the sensitivity value S in accordance with the focal distance, and the like are not especially limited either. In Embodiment 6, it is assumed that the reference focal distance is 50 mm (which corresponds to the angle of view of human eyes), and the ratio of the reference focal distance to the current focal distance is determined as the sensitivity value S. For example, in the case where the focal distance of the camera 101 is set to 100 mm, the sensitivity value S=50/100=½ is determined in S301, and the rotating amount B2=−(1−(½))×θ=−θ/2 is determined in S802. In the same manner, in a case where the focal distance of the camera 101 is set to 300 mm, the sensitivity value S=50/300=⅙ is determined in S301, and the rotating amount B2=−(1−(⅙))×θ=−5θ/6 is determined in S802.

As described above, according to Embodiment 6, at each focal distance, a sensitivity value S in accordance with the corresponding focal distance is determined, and the rotating control of the camera 101 is performed with the determined sensitivity value S. Thereby stable observation can be more easily performed regardless the focal distance.

Embodiments 1 to 6 (including modifications) are merely examples, and configuration acquired by appropriately modifying or changing the configurations of Embodiments 1 to 6 within the scope of the essence of the present invention are also included in the present invention. The configurations acquired by appropriately combining the configurations of Embodiments 1 to 6 are also included in the present invention.

According to this disclosure, stable observation can be performed easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display apparatus that is to be fixed on a head of a user, the display apparatus comprising:
   an image sensor configured to be capable of changing focal distance;
   a display configured to display, as a display range, a part of an image which is captured by the image sensor;
   an orientation detector configured to detect an orientation of the display apparatus; and
   a controller configured to control a position of the display range based on a change of the orientation detected by the orientation detector, and the focal distance,
   wherein the controller controls the position based on the focal distance so that a change of the position becomes smaller in a case where the focal distance is a second distance which is longer than a first distance, compared with a case where the focal distance is the first distance.

2. The display apparatus according to claim 1, wherein the controller further controls the position based on shaking of the display apparatus.

3. The display apparatus according to claim 1, wherein the display range is movable in a panning direction and a tilting direction independently, and a control mode of moving the display range in the panning direction is different from a control mode of moving the display range in the tilting direction.

4. The display apparatus according to claim 1, wherein the controller does not control the position based on the change of the orientation in a case where the focal distance is shorter than a predetermined distance.

5. The display apparatus according to claim 1, wherein the controller does not control the position based on the change of the orientation in a case where an amount of the change of the orientation is smaller than a first amount.

6. The display apparatus according to claim 1, wherein the controller does not control the position based on the change of the orientation in a case where an amount of the change of the orientation is larger than a second amount.

7. A control method of a display apparatus that is to be fixed on a head of a user,
   the display apparatus including:
   an image sensor configured to be capable of changing focal distance; and
   a display configured to display, as a display range, a part of an image which is captured by the image sensor,
   the control method comprising:
   detecting an orientation of the display apparatus; and
   controlling a position of the display range based on a change of the detected orientation, and the focal distance,
   wherein the position is controlled based on the focal distance so that a change of the position becomes smaller in a case where the focal distance is a second distance which is longer than a first distance, compared with a case where the focal distance is the first distance.

8. A non-transitory computer readable medium that stores a program, wherein the program causes a computer to execute a control method of a display apparatus that is to be fixed on a head of a user,
   the display apparatus including:
   an image sensor configured to be capable of changing focal distance; and
   a display configured to display, as a display range, a part of an image which is captured by the image sensor,
   the control method comprising:
   detecting an orientation of the display apparatus; and
   controlling a position of the display range based on a change of the detected orientation, and the focal distance,
   wherein the position is controlled based on the focal distance so that a change of the position becomes smaller in a case where the focal distance is a second distance which is longer than a first distance, compared with a case where the focal distance is the first distance.

* * * * *